J. M. CHAPPEL.
TIME SWITCH.
APPLICATION FILED SEPT. 21, 1908.
996,616.
Patented July 4, 1911.
5 SHEETS—SHEET 1.
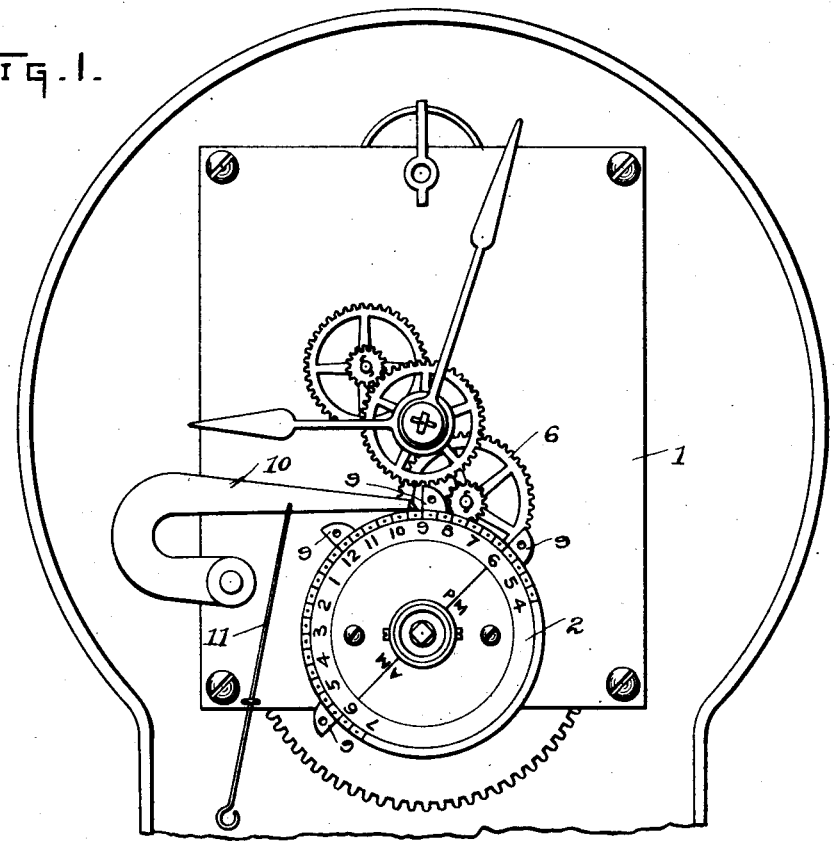
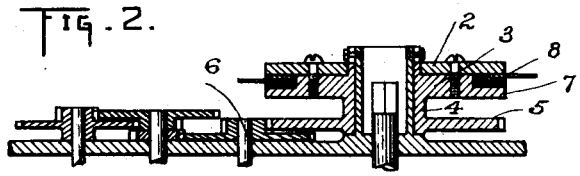
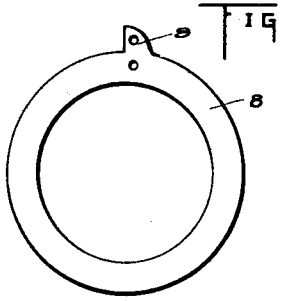
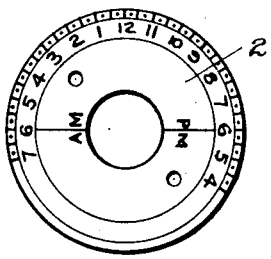
Witnesses
W. H. Bevans.
E. H. Riley
Inventor
J. M. Chappel
By James W. Bevans
his Attorney

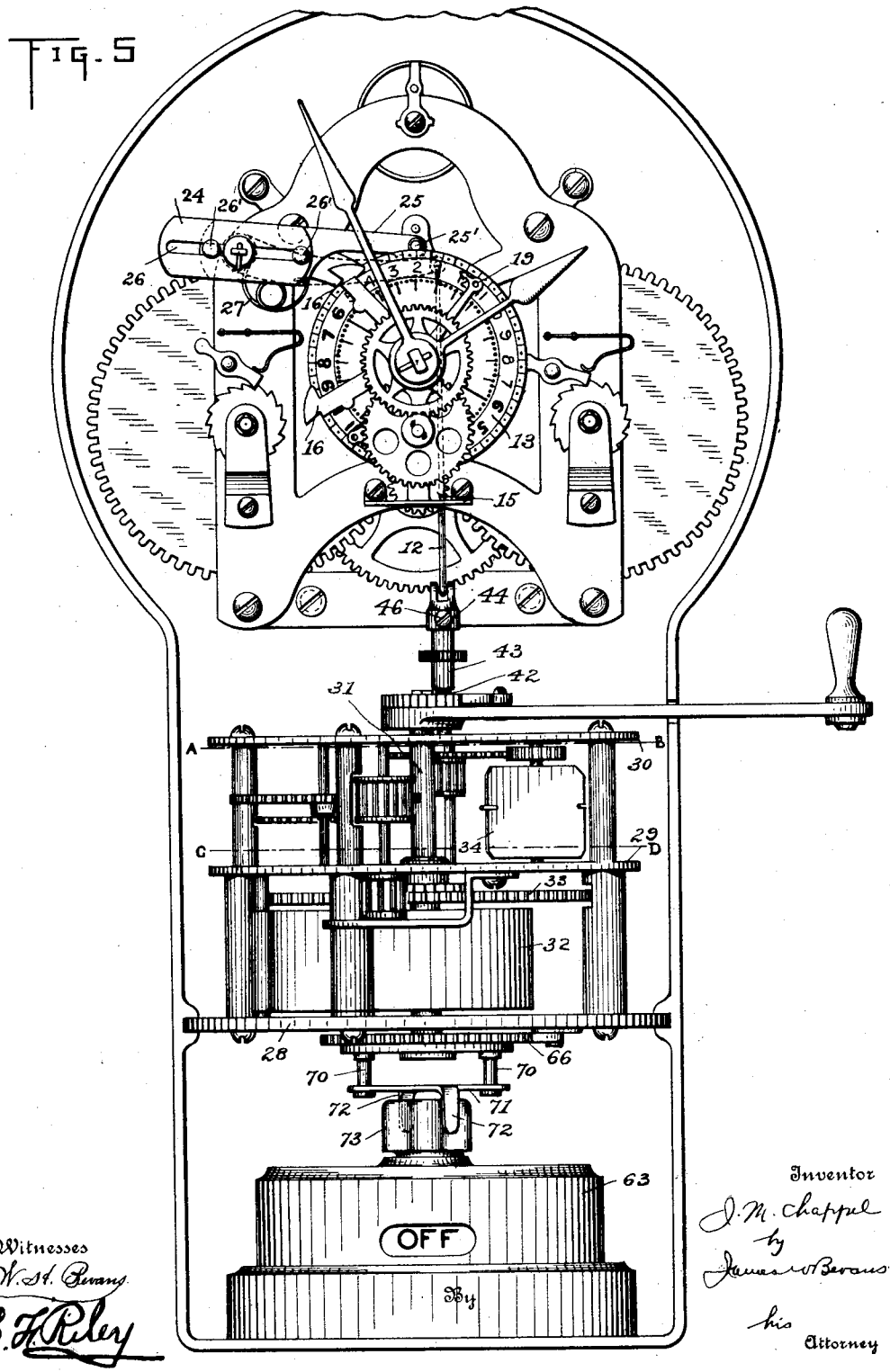

J. M. CHAPPEL.
TIME SWITCH.
APPLICATION FILED SEPT. 21, 1908.
996,616.
Patented July 4, 1911.
5 SHEETS—SHEET 3.
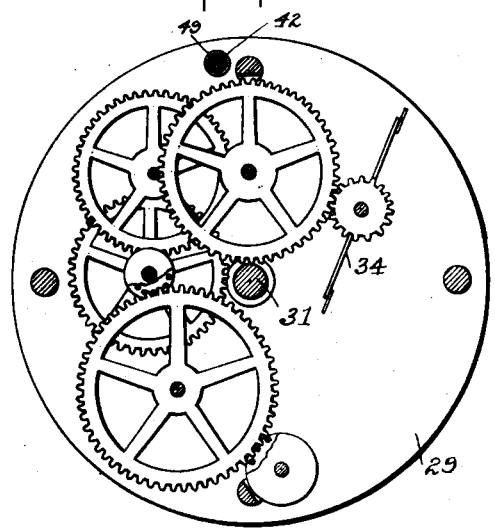
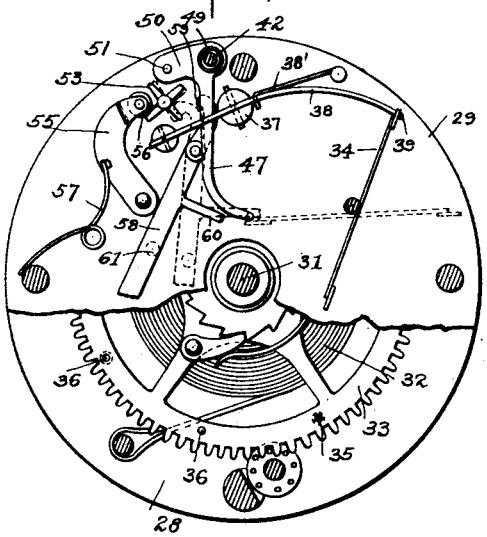
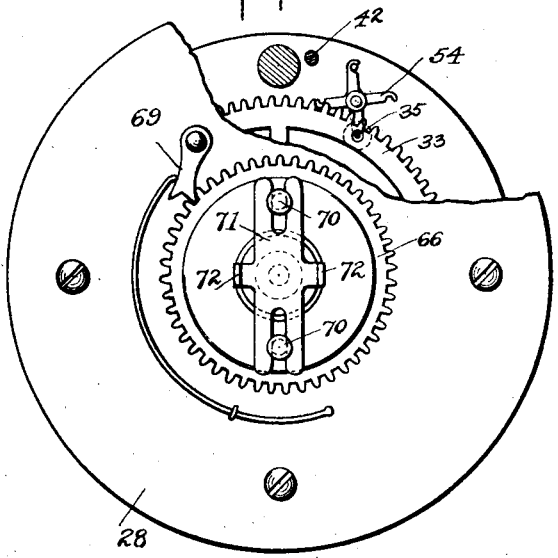
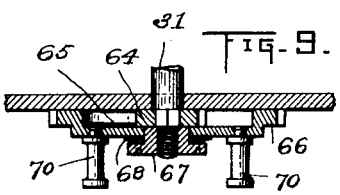
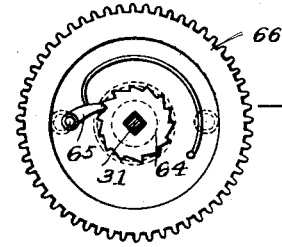
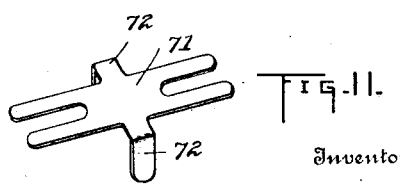
Witnesses
W. A. Bevans
E. F. Riley
Inventor
J. M. Chappel
By James W Bevans
his Attorney
COLUMBIA PLANOGRAPH CO., WASHINGTON, D. C.

J. M. CHAPPEL.
TIME SWITCH.
APPLICATION FILED SEPT. 21, 1908.
996,616.
Patented July 4, 1911.
5 SHEETS—SHEET 4.
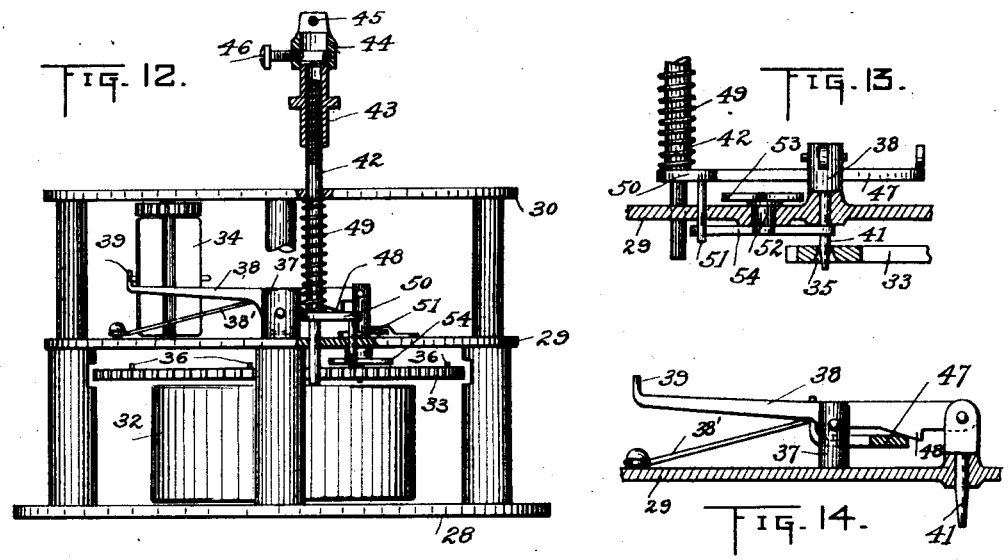
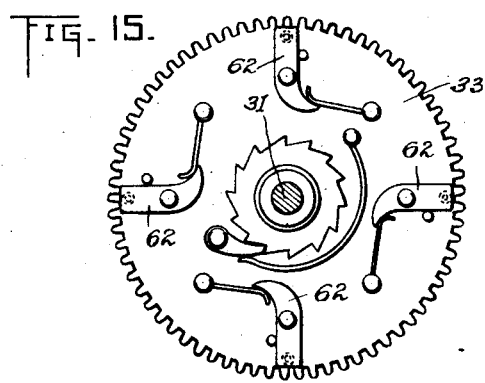
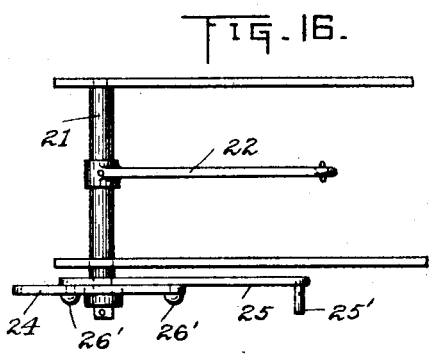
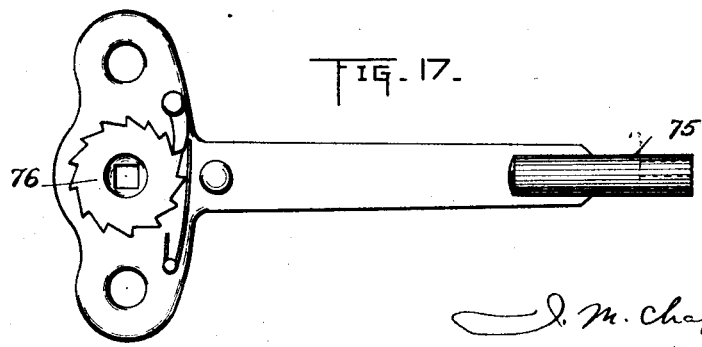
Witnesses
E. F. Riley
E. E. Crutch
Inventor
J. M. Chappel
By James W. Bevans
his Attorney J. M. CHAPPEL.
TIME SWITCH.
APPLICATION FILED SEPT. 21, 1908.
996,616.
Patented July 4, 1911.
5 SHEETS—SHEET 5.
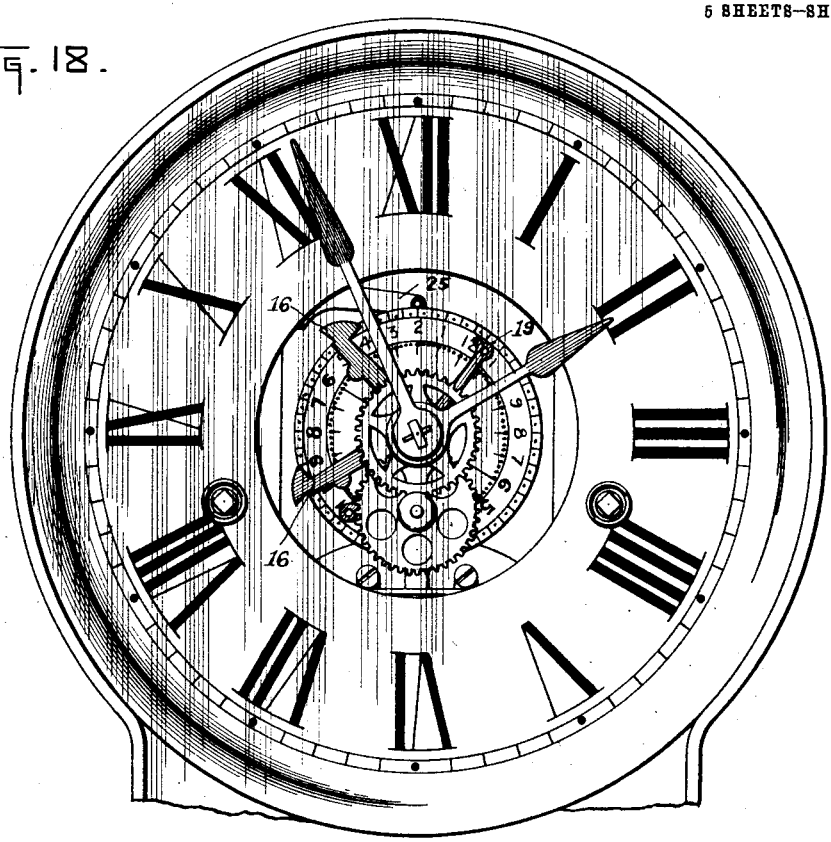
Fig. 18.
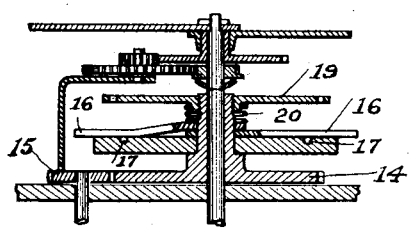
Fig. 19.
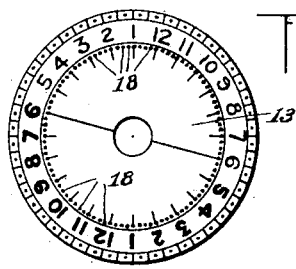
Fig. 20.
Fig. 21.
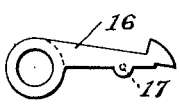
Fig. 22.
Witnesses
E. H. Riley
Inventor
J. M. Chappel
By James W. Bevans
his Attorney

UNITED STATES PATENT OFFICE.

JAMES MACK CHAPPEL, OF DALLAS, TEXAS.

TIME-SWITCH.

996,616.  Specification of Letters Patent.  Patented July 4, 1911.

Application filed September 21, 1908.  Serial No. 453,967.

*To all whom it may concern:*

Be it known that I, JAMES M. CHAPPEL, a citizen of the United States, residing at Dallas, in the county of Dallas and State of Texas, have invented certain new and useful Improvements in Time-Switches, of which the following is a specification.

This invention relates to improvements in time-switches, and the object is to provide a simple and effective time-controlled mechanism of improved construction for automatically operating an electric switch to throw the lights controlled thereby on or off at predetermined times.

With the above object in view, the invention consists in the novel features of construction hereinafter fully described, particularly pointed out in the claims and clearly illustrated by the accompanying drawings, in which—

Figure 1, is a face view of one form of time-mechanism constructed in accordance with my invention; Fig. 2, a sectional view through the setting-dial and the train of gears interposed between the same and the center-shaft or hand-arbor of the clock-mechanism; Fig. 3, a face view of one of the adjustable tripping-members carried by the revolving setting-dial; Fig. 4, a face view of the setting-dial; Fig. 5, a face view of the complete mechanism and switch with the inclosing-case, the time-mechanism shown in this figure differing in construction from that shown in Figs. 1, 2 and 3, but the motor illustrated being common to both forms; Fig. 6, a sectional view on the line A—B of Fig. 5, showing the train of gears and fly of the spring-motor; Fig. 7, a sectional view on the line C—D of the same figure with the central diaphragm or plate of the motor-frame partially broken away; Fig. 8, a bottom plan view of the motor with the bottom plate partially broken away; Fig. 9, a sectional detail view of the ratchet member for connecting the motor and switch; Fig. 10, a plan view of the same; Fig. 11, a perspective view of the connecting-plate interposed between the ratchet-member and the key of the switch; Fig. 12, a side elevation of the motor with some of the gears removed to better show the mechanism for normally holding the motor from movement and for releasing the same; Fig. 13, a sectional detail view of said mechanism; Fig. 14, a similar view; Fig. 15, a plan view showing a modified construction of means for preventing the relocking of the motor after it has been tripped until it has actuated the switch; Fig. 16, a view of the form of tripping-lever used in the time-mechanism shown in Fig. 5; Fig. 17, a plan view of the winding-key for the motor and clock-mechanism; Fig. 18, a face view of the time-mechanism shown in Fig. 5 with the hour dial and hands of the clock-mechanism in place; Fig. 19, a sectional view through the setting dial and gears for revolving the same, shown in Fig. 5; Fig. 20, a face view of the setting-dial shown in said Fig. 5; Fig. 21, a face view of the locking-member for the adjustable tripping-members of Fig. 5, and Fig. 22, a similar view of one of said tripping-members.

My improved time-operating mechanism for switches consists of a spring motor, a time-mechanism comprising a clock-mechanism and a setting-mechanism together with a tripping device, and a motor retaining and releasing mechanism, the whole with the switch being compactly arranged in a single case in such manner that the clock-mechanism, motor and switch are readily accessible and capable of being separately removed or placed in the case in operative relation.

Referring now more particularly to Figs. 1, 2, 3 and 4 of the drawings, the numeral 1 designates an ordinary clock-mechanism of the eight-day type having the usual dial and hands. To this mechanism I have added a revolving setting-dial 2, which is divided by suitable graduations into twenty-four divisions, representing twenty-four hours, and also having divisions representing fractions of hours. These graduations may be marked with numerals to indicate each hour of the twenty-four but it is less confusing to so mark the hours of the day and night that the switch-mechanism is likely to be used for turning the lights on or off. The hours of the night are marked either by heavier numerals or by black numerals to distinguish from the hours of the day. The dial consists of a plate 3 formed integral with a revolving hub 4, said hub carrying a gear 5 which may be attached thereto or formed integral therewith. Meshing with this gear 5 is a gear-train 6 which also meshes with a pinion placed on the hand-arbor, the arrangement being such that the dial 2, which is attached to the plate 3 as will be presently described, will be revolved completely once in twenty-four hours. The plate 3 is reduced on its periphery to form a circumferential shoulder or flange 7. The dial 2 is attached to the face of plate 3 by screws in any other manner so that it may be readily detached. This dial is of sufficient size to project beyond the reduced periphery of the plate 3 and form a flange at the front face of the plate corresponding to flange 7 at the rear face thereof. Inserted on the reduced portion of the plate 3 and normally held between the flange 7 and the dial, are rings 8, each carrying a cam-tripping lug or member 9. There may be any desired number of these rings according to the number of times it may be desired to throw the switch on or off during the twenty-four hours. When these rings are in place the outermost one projects slightly beyond the outer face of the plate 3, whereby when the dial is secured in position, the rings will be held tightly between the two flanges. These rings are adjusted to bring the lugs to the proper graduations on the dial to trip the switch-operating mechanism at the desired times.

Pivotally mounted adjacent to the dial 2, is a lever 10, formed preferably of spring metal so as to be capable of being sprung laterally to bring its operative-end out of the path of the lugs for the purpose presently to be described, and to automatically resume its normal position. For raising the operative-end of the lever and also for moving it laterally, I provide a rod 11 which may extend to the exterior of the case. This lever is operatively connected by a rod 12 with the releasing mechanism of the spring-motor, which mechanism is actuated by the raising and lowering of this rod. This action is the same in both forms of time-mechanism illustrated.

The operation of this portion of my invention is as follows: The rings are adjusted to bring the lugs to the proper point to trip the mechanism at the desired times. As the dial 2 revolves, the lugs ride under the lever and lift the operative-end of the same, causing the operating rod 12 to be raised. When the lugs pass from beneath the lever, the latter drops, effecting a corresponding movement of the operating-rod. The mechanism may be tripped at any time except when the lever is on the incline of the lugs, by pushing up on rod 11. The tripping of the mechanism cannot be thus effected when the lever is on the incline, for the reason that to release the motor, both an up and down movement of the operating-rod is required, and the downward movement would be prevented by the incline of the lug. For this reason, the lever in addition to being lifted by the rod 11, must be sprung laterally to clear the lug. After the lug has passed the lever springs to normal position.

In the time-mechanism described, the dial 2 rotates with the hands of the clock, though at a different speed, so that the same relation is always maintained. Thus it is only necessary to see that the clock is keeping proper time. Further, should the clock stop from any cause, when started, it is merely necessary to set the hands to indicate the correct time and the dial 2 will also be brought to correct position.

The time-mechanism illustrated in Figs. 5, 18, 19, 20, 21 and 22, consists of a clock-movement also of a common type with the usual hour-dial and hands. In this form of time-mechanism, I provide a setting-dial 13, graduated to represent twenty-four hours and fractions thereof, as clearly illustrated in Fig. 20. This dial is removably secured on the hub of a gear 14 which meshes with a pinion 15 driven by the clock-movement, the arrangement being such that the dial makes one complete revolution in twenty-four hours. Fitting on the same hub with the dial 13, are arms 16 which may be swung to any point on the dial, said arms each carrying a cam tripping-portion projecting beyond the periphery of the dial. These arms, of which there may be two or more, carry projections or pins 17 which enter depressions 18 formed in the face of the dial, thus holding said arms in the desired adjustment relative to the dial. For holding the arms with their pins in the depression of the dial, a locking-member 19 is provided which is threaded on the outer portion of the hub with a spring 20 interposed between it and the arms. This locking-member is provided at each end with perforations in which some convenient tool or other article may be inserted for the purpose of screwing or unscrewing it to unlock or lock the tripping-arms.

Pivoted in the clock-frame is a pin 21 carrying an arm 22 to which the operating-rod 12 is connected, the other end of said rod being operatively attached to the releasing mechanism of the motor. The operating-lever is formed of two parts, 24 and 25, slidably connected by means of a slot 26 and pins 26'. The part 24 is pivotally mounted on the pin 21, while the part 25 carries a pin 25' which rides on the periphery of the dial, and is lifted by the cam-projections of the tripping-arms. The tripping of the motor is effected by the raising and lowering of the operating-rod in the same manner as in the first form of time mechanism described.

To trip the motor by hand at any time the operating lever may be raised and dropped. When the lever is on the incline of the tripping-arms 16, it may be raised and the part 25 moved on the part 24 until the pin 25 clears the inclined portion so that the lever may move downwardly until the pin rests on the periphery of the rotary dial thus effecting the lowering of the operating rod. A spring 27 holds said part 25 in its normal position.

The operating-mechanism consists of a spring motor comprising a frame consisting of a base 28, a central plate or diaphragm 29, and a top-plate 30, spaced by suitable posts.

31 designates the winding post which is mounted in the frame and has its upper end projecting therefrom and formed to receive a winding-key. The clock-spring 32 which is disposed in the space between the base 28 and the central plate 29, is connected with the post or shaft 31. Attached to the post 31 just below the central plate is a gear-wheel 33 which meshes with a gear-train positioned in the space between the top-plate and the central plate. This gear-train operates a fly 34 as clearly shown in Fig. 6. Said wheel 33 is provided about its rim with four equi-distant perforations 35 and a corresponding number of pins or projections 36, the pins being placed centrally in the spaces between the perforations.

Pivotally mounted on a stud 37 carried by the upper side of the central plate is a detaining-lever 38, said lever being intermediately pivoted and having at one end an engaging-portion 39 adapted to normally engage one of the pins or projections carried by the fly, so as to normally hold the latter from movement. Pivotally attached to the opposite end of this lever, is a pin 41, passing through a perforation in the central plate and entering one of the perforations 35 in the wheel 33 of the motor mechanism, thus holding the motor from operation. For actuating this detent or lever to raise the pin 41 from engagement with the wheel 33 and at the same time to remove its engaging-portion from the path of the fly, I provide a sliding-rod 42 which is connected with the operating-rod of the tripping-mechanism hereinbefore described, by an adjustable connection. This connection consists of a sleeve 43 threaded on the upper end of the rod 42, and a collar 44 with which said sleeve is rotatively connected. The collar carries a pin or loop 45 with which the lower end of the operating-rod is detachably connected. A set-screw 46 locks the sleeve and collar together when the desired adjustment has been secured. By this adjustable connection between the operating-rod and the sliding-rod an adjustment may be made to secure the proper movement of the latter to actuate the detaining lever. The sliding-rod carries a branched arm, one branch 47 of which extends beneath the lever 38, and by coöperation with a cam 48 formed on the under side of the latter, effects its movement to release the fly and disengage the pin 41 from the wheel 33, when the sliding-rod is moved upwardly. A spring 38' restores lever 38 to its normal position. The branch 47 of the arm carried by the sliding-rod has its free end disposed to engage the fly when the latter has been released by the lever 38, so as to hold it from movement until the sliding-rod has moved downwardly. This downward movement occurs when the tripping-lever of the time-mechanism slips off the cam-tripping arms carried by the setting-dial. A coiled spring 49 serves to assist the downward movement of the sliding-rod. The other branch 50 of the arm carried by the sliding-rod carries a pin 51 which extends through a perforation formed in the central plate, to the under side thereof, for the purpose presently to be set forth.

To prevent any possibility of the pin 41 carried by the lever 38 entering the same perforation in the wheel 33 from which it has just been withdrawn, upon the downward movement of the sliding-rod, or the riding of the pin on the rim of wheel 33 during the rotation of the latter, I provide a mechanism consisting of a shaft 52 mounted in the central plate and carrying on the upper side of the plate, a star-wheel 53, and on the under side thereof, a similar wheel 54, each of which is provided with four teeth or arms. Pivoted upon the upper side of the central plate is a lever 55 carrying at one end a roller 56 engaging the arms or teeth of the star-wheel 53. A spring 57 presses said lever with its roller in engagement with said star-wheel, and the tendency of said lever is to normally move said shaft 52 to bring the star-wheel 54 in such position that one of the arms thereof is directly beneath and covering the perforation in the plate through which the pin 41 carried by the detaining-lever 38, passes. This action of the star-wheel is however, normally prevented by the pin 51 of the arm 50 carried by the sliding-rod.

The operation of this portion of my invention is as follows: When the operating-rod is raised by the tripping-arms carried by the revolving setting-dial, in the manner hereinbefore set forth, the sliding-rod 42 is also raised, effecting the movement of the detaining lever 38 to release the fly and at the same time withdraw the pin 41 from the perforation of the wheel 33. The arm carried by the sliding-rod is also moved to bring its branch or fork 47 into position to engage and stop the movement of the fly as soon as the latter is released by the lever 38. The pin 51 carried by the branch 50 of the arm of the sliding-rod is also moved out of engagement with the star-wheel 54, permitting lever 55, by pressure on the star-wheel 53, to move said star-wheel 54 with one of its arms or teeth in position beneath the perforation in the central plate of the motor-frame, so as to prevent the pin 41 from entering the same perforation in the wheel 33 from which it has just been withdrawn. When the operating-rod drops, the sliding-rod also moves downwardly, releasing the fly and permitting the spring of the motor to act. On the downward movement of the sliding-rod, the pin 51 drops in rear of one of the teeth of the star-wheel 54. It will thus be seen that the motor does not act until the operating-rod has dropped, which relieves the clock-mechanism from any shock or jar and effects the throwing of the switch exactly at the predetermined time. When the fly is released the spring of the motor causes the wheel 33 to revolve until one of the pins carried thereby engages the star-wheel 54, moving the latter out of its position closing the perforation in the central plate of the frame. The pin 41 then drops into the next perforation of the wheel 33 and locks the operating-mechanism from further action. The parts are so arranged that wheel 33 makes one-fourth of a revolution each time the mechanism is tripped.

The locking of the motor movement without disturbing the action of the clock-mechanism is effected by a lever 58 pivoted on the upper side of the central plate and formed with an engaging-portion 59 and an arm 60. When this lever is moved in one direction, the portion 59 engages the star-wheel 53 and thus prevents movement of the star-wheel 54 when the lever 38 is raised to release the fly and disengage the pin 41 from the perforation of the wheel 33. At the same time the arm 60 is moved in position to engage the fly and hold the same from movement. Thus when the sliding-rod drops, the pin 41 of the lever 38 enters the same perforation in the wheel 33 from which it was withdrawn and the pin 51 likewise returns to its same position relative to the star-wheel 54. This lever 58 is of spring metal and is formed with a projection 61 which springs into depressions in the central plate and thus holds the lever in either of its two positions.

Fig. 15 illustrates a modified construction for preventing the relocking of the operating-mechanism before the motor can act to throw the switch. In this construction I dispense with the star-wheels 53 and 54 and likewise with the pin 51 carried by the arm of the sliding-rod, and in lieu thereof provide intermediately-pivoted, spring-pressed members 62 carried by the wheel 33 adjacent to the perforations of the latter. These members are normally pressed by their springs to cover the perforations. As soon as the pin 41 is withdrawn from a perforation in the wheel, one of the members 62 covers said perforation and prevents the pin entering the same on the downward movement of the sliding-rod. When the wheel has nearly completed a fourth-revolution the pivoted member 62 covering the next perforation is moved to uncover said perforation by contact with pin 41 so that the latter can enter the perforation and stop the further action of the motor.

63 designates the switch which is of the "snap" type, said switch being positioned in the casing below the motor. The post or shaft 31 of the motor carries below the bottom plate of the frame, a ratchet 64 engaged by a spring-pressed pawl 65 carried by a toothed wheel or disk 66. This wheel 66 fits loosely on the post or shaft 31 and is cut out on its inner face to receive and incase the ratchet 64, said wheel being held on the shaft by a sleeve 67 which is threaded on the end of the post, a spring washer 68 being interposed between the flange of this sleeve and the disk 66. A spring-pressed pawl 69 engages the teeth of the wheel or disk 66 and offers a sufficient resistance to prevent rotation of the latter when the motor-spring is being wound. This disk 66 has depending therefrom, two diametrically-oppositely placed headed studs 70. The switch is operatively connected with the disk 66 by a detachable connecting-member 71, slotted to be inserted on the headed studs and having two depending arms 72 to straddle the key 73 of the switch. The switch may be readily connected with the disk or disconnected therefrom by placing the member 71 with its arms straddling the key and then turning the disk until the studs carried thereby are in position to enter the slots of said connecting member. The ratchet connection permits the movement of the disk so that the switch may be connected without changing the position of its key. Further by means of the ratchet and pawl, the motor may be wound without effecting the movement of the switch-key. The arrangement of the disk 66 with its teeth engaged by the pawl 69 serves to relieve pressure on the gear-train of the motor and prevents jar or rebound when the switch is snapped.

A very convenient winding key is shown in Fig. 17, in the shape of an ordinary key having at one end the usual stem 75 for winding the clock-mechanism, and provided at its opposite end with a ratchet winding device 76 for winding the motor.

Having thus fully described my invention, what I claim as new and desire to secure by Letters Patent of the United States is:

1. In a time-switch, a clock-mechanism, a revolving plate actuated by the clock-mechanism and reduced on its periphery to form a hub or boss, a dial detachably secured to the face of the hub or boss and projecting beyond the periphery thereof, said dial being graduated into hours and fractions thereof, rings fitting on said hub or boss between the plate and dial and carrying tripping-arms, a motor, means actuated by said tripping-arms for releasing the motor, and a switch operatively connected with the motor.

2. In a time-switch, a clock-mechanism, a motor, a switch operatively connected with the motor, a locking-device for normally holding the motor inactive comprising a pivoted-member and a pin carried thereby for engaging a moving part of the motor, means actuated by the clock-mechanism for effecting the movement of the pivoted-member to disengage the pin from the motor, a member automatically moving between said pin and moving part of the motor when the former has been disengaged from the latter, and means for automatically moving said member from beneath the pin when the motor has actuated the switch.

3. In a time-switch, a clock-mechanism, a motor, a switch operatively connected with the motor, a locking device for normally holding the motor inactive comprising in part a pin for engaging a moving part of the motor, a tripping-member actuated by the clock-mechanism at predetermined times for moving said pin out of engagement with the moving part of the motor, a member for preventing reëngagement of the pin with the motor, a spring tending to normally move said member between the pin and moving part of the motor, said member being prevented from assuming this position by the tripping-member until the latter has been operated to disengage the pin from the moving part of the motor, and means carried by the moving part of the motor for moving said member out of the way of the pin when the motor has actuated the switch.

4. In a time-switch, a clock-mechanism, a motor, a switch operatively connected with the motor, a locking-device for normally holding the motor inactive comprising in part a pin engaging a moving part of the motor, a tripping-member actuated at predetermined times for moving said pin to disengage the moving part of the motor, a shaft, two star-wheels carried thereby, one of which is adapted to be interposed between the pin and the moving part of the motor when said pin has been disengaged from the latter, spring-pressed means engaging the other star-wheel and tending to actuate the shaft to move said first-mentioned star-wheel in position with one of the teeth thereof beneath the pin, means carried by the tripping-member for engaging and normally holding said star-wheel from beneath said pin, said tripping-member releasing said wheel when moved to disengage the pin from the moving part of the motor, and means carried by the moving part of the motor for engaging and moving the star-wheel from beneath the pin when the motor has actuated the switch.

5. In a time-switch, a clock-mechanism, a motor, a switch operatively connected with the motor, a fly and fly-train, a locking device normally holding the motor inactive comprising a member normally engaging the fly and a moving part of the motor, a tripping-member actuated by the clock-mechanism at predetermined times to disengage the locking-member from the moving part of the motor and the fly, and a member carried by said tripping-member for engaging the fly when the locking-member has disengaged the same, said tripping-member in one movement actuating the locking-member to disengage the fly and moving part of the motor and bringing the member carried by it into engagement with the fly, and on its return to normal position releasing the fly and permitting the motor to actuate the switch.

6. In a time-switch, a clock-mechanism, tripping-members actuated thereby, a pivoted lever actuated by said tripping-members, a motor, means for normally holding said motor inactive, means for actuating said holding-means to release the motor comprising in part a sliding-member having a screw-threaded end, a connecting-member comprising a sleeve adjustable on said screw-threaded sliding-member and a collar having a swivel-connection with the sleeve, an operative connection between the collar and pivoted lever, and a switch operatively connected with the motor.

7. In a time-switch, a clock-mechanism, a motor having a winding-shaft, a ratchet-wheel carried by said shaft, a disk loose on said shaft having a pawl engaging said ratchet-wheel and formed about its periphery with teeth, a pawl carried by a fixed part engaging the teeth of the disk, headed spaced studs carried by the disk, a snap-switch having a key, and a plate having slots to receive the headed studs and spaced arms to receive the key of the switch therebetween.

8. In a time-switch, a clock-mechanism, a motor having a rotary-member formed with spaced perforations, a locking-member comprising a pivoted-lever carrying a pin adapted to enter said perforations and hold the rotary-member from movement, means actuated by the clock-mechanism at predetermined times for moving said lever to withdraw said pin from the perforations of the rotary-member to release the motor, means automatically moving to cover the perforation from which the pin is withdrawn, means carried by the rotary-member for automatically moving said covering means out of the path of the pin to permit the latter to enter a perforation when the rotary-member has made a partial revolution, and a switch operatively connected with the motor.

9. In a time-switch, a clock-mechanism, a motor having a rotary-member formed with spaced perforations, a locking-member comprising a pivoted-lever carrying a pin adapted to enter said perforations and hold the rotary-member from movement, means actuated by the clock-mechanism at predetermined times for moving said lever to withdraw the pin from the perforations of the rotary-member to release the motor, means automatically moving to cover the perforation from which the pin is withdrawn, means carried by the rotary-member for automatically moving said covering-means out of the path of the pin to permit the latter to enter a perforation when the rotary-member has made a partial rotation, and a switch operatively connected with the motor.

10. In a time-controlled switch, a clock-mechanism, a motor having a rotary-member formed with spaced perforations and carrying studs adjacent thereto, a locking-member comprising a pivoted-lever carrying a pin adapted to enter said perforations and hold the rotary-member from movement, means actuated by the clock-mechanism at predetermined times for moving said lever to withdraw the pin from the perforations of the rotary-member to release the motor, a pivoted-member automatically moving to cover the perforation from which the pin is withdrawn, said member being moved out of the path of the pin by the studs carried by the rotary-member when the latter has made a partial revolution, and a switch operatively connected with the motor.

11. In a time-switch, a clock-mechanism, a motor having a rotary-member formed with spaced perforations and carrying studs adjacent to the perforations, a locking-member comprising a pivoted-lever carrying a pin adapted to enter said perforations and hold the rotary-member from movement, a member actuated by the clock-mechanism at predetermined times for moving said lever to withdraw the pin from the perforations of the rotary-member to release the motor, a pivoted-member automatically moving to cover the perforation from which the pin has been withdrawn, said pivoted-member being moved out of the path of the pin by the studs carried by the rotary member when the latter has made a partial revolution, said member actuated by the clock-mechanism normally holding the pivoted-member from covering the perforations of the rotary-member, and a switch operatively connected with the motor.

12. In a time-switch, a clock-mechanism, a motor having a rotary-member formed with spaced perforations and carrying studs adjacent to the perforations, a locking-member comprising a pivoted-lever carrying a pin adapted to enter said perforations and hold the rotary-member from movement, a shaft, a star-wheel carried by said shaft adapted to move to position covering the perforation from which the pin is withdrawn, a spring-actuated member tending normally to move said wheel to this position, a member actuated by the clock-mechanism at predetermined times for effecting the withdrawal of the pin carried by the locking-member from the perforation of the rotary-member, said member normally holding the star-wheel from position covering the perforation in the rotary-member, said star-wheel being moved to uncover the perforation by the studs carried by the rotary-member when the latter has made a partial revolution, and a switch operatively connected with the motor.

13. In a time-switch, a clock-mechanism, a motor having a rotary-member formed with spaced perforations and carrying studs adjacent to the perforations, a fly-train forming part of the motor, a pivoted locking-member normally engaging and holding the fly from movement and carrying a pin entering one of the perforations of the rotary-member and preventing movement of the latter, a reciprocating member actuated by the clock-mechanism at predetermined times, said member on its movement in one direction effecting the movement of the pivoted locking-member to release the fly and withdraw the pin from the rotary-member and at the same time engaging the fly and preventing movement thereof, and on its movement in a reverse direction releasing the fly, a member automatically moving to cover the perforation from which the pin has been withdrawn, said member being moved to uncover the perforations by the studs carried by the rotary-member when the latter has made a partial revolution, and a switch operatively connected with the motor.

14. In a time-switch, a motor having a rotary-member, a locking-device having a pin adapted to engage and hold said rotary-member from movement, a clock-mechanism, means actuated by the clock-mechanism at predetermined times for moving said locking-member to withdraw the pin from engagement with the rotary-member, a member automatically moving beneath said pin when the latter has been disengaged from the rotary-member, means carried by the rotary-member for effecting the movement of the said member from beneath the pin when said rotary-member has made a partial revolution, a locking-lever for engaging said automatically-moving member and preventing it from moving beneath the pin to permit the clock-mechanism to operate without releasing the motor, and a switch operatively connected with the motor.

In testimony whereof I affix my signature in the presence of two witnesses.

JAMES MACK CHAPPEL.

Witnesses:
CHAS. H. ELDERD, Jr.,
E. W. SCHEN, Jr.

Copies of this patent may be obtained for five cents each, by addressing the "Commissioner of Patents, Washington, D. C."